United States Patent [19]

Prill

[11] 3,742,047

[45] June 26, 1973

[54] PREPARATION OF ACID CHLORIDES
[75] Inventor: Erhard J. Prill, St. Louis, Mo.
[73] Assignee: Monsanto Company, St. Louis, Mo.
[22] Filed: Oct. 27, 1969
[21] Appl. No.: 870,969

Related U.S. Application Data
[62] Division of Ser. No. 647,588, June 21, 1967, abandoned.

[52] U.S. Cl. .............................. 260/544 Y, 260/408
[51] Int. Cl. ............................................. C07c 51/58
[58] Field of Search ................................ 260/544 Y

[56] References Cited
UNITED STATES PATENTS
3,576,860  4/1971  Zazaris.......................  260/544 Y X
  752,947  2/1904  Bauml..............................  260/544

FOREIGN PATENTS OR APPLICATIONS
1,103,913  4/1961  Germany ........................ 260/544 Y Primary Examiner—Lorraine A. Weinberger
Assistant Examiner—Richard D. Kelly
Attorney—Neal E. Willis, John J. Henschke, Jr. and David D. Centola

[57] ABSTRACT

A process for the preparation of carboxylic acid chlorides and more specifically, the preparation of α-chloro acetyl chloride utilizing trichloroethylene as the starting compound. Carboxylic acid chlorides are useful compounds as intermediates in organic processes for the preparation of herbicides having an α-chloroacetyl moiety.

4 Claims, No Drawings

PREPARATION OF ACID CHLORIDES

This aplication is a division of co-pending application, U.S. Pat. Ser. No. 647,588, filed June 21, 1967 and now abandoned.

Carboxylic acid chlorides are usually prepared by the replacement of the hydroxyl moiety of the corresponding acid, with a chlorine atom from the reaction of compounds such as phosphorus trichloride, phosphorus pentachloride, thionyl chloride and the like, with carboxylic acids. These previously known methods of preparation have the disadvantage of low conversion yields and/or impurities which are difficult to separate from the acid chloride produced.

It is therefore an object of this invention to provide a novel process for the preparation of carboxylic acid chlorides which eliminates the above disadvantages.

It is a further object of this invention to provide a process for the preparation of α-chloro-acid chlorides.

It is a more specific object of this invention to provide a process for the preparation of α-chloroacetyl chloride.

Further objects, aspects and advantages of the invention will be apparent from the description which follows.

Briefly, this invention provides a novel synthetic process for the preparation of carboxylic acid chlorides by the reaction of a mixture of a substituted 1,1-dichloro-1-olefin and a carboxylic acid, with a sulfonic acid derivative or sulfuric acid according to the following equation:

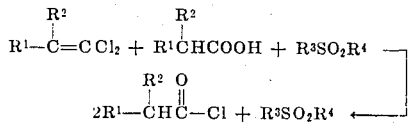

wherein $R^1$ and $R^2$ are each selected from the group consisting of hydrogen, halogen, and alkyl having a maximum of eight carbon atoms; $R^3$ is selected from the group consisting of hydroxyl (-OH), methyl, ethyl, phenyl and alkyl, having a maximum of two carbon atoms and substituted phenyl, and $R^4$ is selected from the group consisting of hydroxyl and chlorine.

In a preferred embodiment of this invention an olefin of the formula

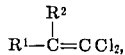

wherein $R^1$ and $R^2$ are each independently selected from the group consisting of hydrogen, halogen, and alkyl having a maximum of four carbon atoms, is reacted with a sulfonic acid derivative of the formula $R^3SO_2OH$ wherein $R^3$ is as previously defined and a carboxylic acid of the formula

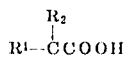

wherein $R^1$ and $R^2$ are each independently selected from the group consisting of hydrogen, halogen, and alkyl having a maximum of four carbon atoms.

The preparation of the starting unsaturated compounds are known in the art. Compounds, such as 1,1-dichloro-1-propene,

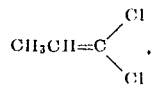

can be prepared according to the procedure of Farrell and Backman, J. American Chemical Society, 55, 4,279 (1933) and 57, 1,281 (1935). Trichloro unsaturated compounds, such as trichloroethylene, $CHCl = CCl_2$, can be prepared by thermal decomposition of tetrachloroethane or by heating the tetrachloro derivative with a calcium hydroxide solution.

Carboxylic acids and halogenated carboxylic acids are obtained by a variety of known synthetic reactions. Non-halogenated carboxylic acids are also obtained from natural sources.

The acid utilized in this reaction should be essentially free of water. Examples of satisfactory acids are "100 percent" sulfuric acid, p-toluenesulfonic acid, methanesulfonic acid, ethanesulfonic acid and the like.

The reaction is normally conducted in the absence of a solvent, however, a chemically inert solvent such as saturated hydrocarbons including n-hexane, n-heptane, and n-octane can be used without any detrimental effects. When a solid acid, such as p-toluenesulfonic acid, is used it is preferred to dissolve the acid in a small amount of solvent such as n-heptane, n-octane and the like to facilitate mixing and contact of reactants.

As a general procedure, a small amount of the halogenated olefin is added to the acid, with stirring, in the approximate temperature range of 60°–90° C. After a period of approximately 15–25 minutes, the remaining olefin, mixed with the corresponding carboxylic acid, is added with stirring to the reaction mixture. The resultant mixture is stirred at a temperature in the approximate range of 80°–120° C. for approximately 1-½ to 2 hours. The desired acid chloride is separated from the reaction mixture, preferably by distillation.

The unsaturated compound and the carboxylic acid can be added together to the acid without a prior addition of a small amount of the unsaturated compound to the acid.

In a modification of the general reaction a small amount of the carboxylic acid is added to the sulfonic acid derivative $R^4SO_2OH$, wherein $R^4$ is chlorine, with stirring in the approximate temperature range of 55°–75° C. After an initial reaction period of about 14 minutes, a mixture of carboxylic acid and olefin is added with stirring to the reaction mixture. The resultant mixture is stirred at a temperature in the approximate range of 80°–120° C. for approximately 1 ½ to 2 ½ hours. The desired acid chloride is separated from the reaction mixture, preferably by distillation.

Another modification of the general reaction is one in which the reaction is terminated after the reaction of the carboxylic acid and sulfonic acid derivative $R^3SO_2R^4$, wherein $R^3$ is hydroxyl and $R^4$ is chlorine, and either the acid chloride product recovered or the halogenated olefin is added to the reaction medium and the reaction continued. In this modification, $R^4$ must be chlorine.

Other modifications of the general procedure includes the recycling or addition of hydrogen chloride during the reaction and recovery steps or during either step. Higher yields of acid chlorides are obtained in the presence of the hydrogen chloride.

A further modification of the general procedure is one in which the reaction is terminated after the reaction of the halogenated olefin and the acid, $R^3SO_2R^4$, in a 1:1 mole ratio, and the resultant acid chloride either separated from the reaction mixture or the carboxylic acid is added to the reaction medium and the reaction continued. In this modification, $R^4$ must be hydroxyl.

The reaction temperature is usually maintained in the approximate range of 75°–125° C. Temperatures above 125° C. can be used but the possibility of side effects, such as polymerization, sulfonation and anhydride formation, increases which would result in a lower yield.

When a mixture of olefin and carboxylic acid is utilized, the amount of acid present can be less than a mole basis with the reactant since it is constantly being reformed in the reaction medium. In the procedures of this invention the preferred acid concentration is in the approximate range of 0.25 to 1 mole of acid/mole of reactant, the exact amount being dependent upon the reactant used. Concentrations outside this range, however, can be used, but may require longer reaction times or lower reaction temperatures and the presence of solvent depending upon whether the concentration is lower or higher than the indicated preferred range. The olefin and carboxylic acid are present in this reaction in an approximate 1:1 mole ratio.

The method of this invention permits the formation of mixed acid chlorides by the addition of a carboxylic acid which does not correspond to the acid chloride formed from the olefin. Since this entails a separation problem in obtaining the pure acid chloride, this variation has limited use except where the acid chlorides are easily separated or the mixture of acid chlorides can be employed.

The following examples are illustrative of the invention:

EXAMPLE 1

α-Chloroacetyl chloride was prepared according to the following procedure:

To a 250 ml reaction flask, fitted with a stirrer and a reflux condenser, containing 50 g (0.5 moles) "100 percent" sulfuric acid, prepared from 26.6 g (14.4 ml) 96 percent sulfuric acid and 23.4 g (12.2 ml) 20 percent oleum, at a temperature of approximately 80° C. was added approximately 13 grams of trichloroethylene in one portion. Some evolution of HCl gas occurred. After about 15 minutes, a mixture of 52.8 grams (a total of 0.5 moles) of trichloroethylene and 47.2 grams (0.5 moles) chloroacetic acid was added over a period of 5 minutes with vigorous stirring. The reaction mixture was stirred at a temperature of 80°–103° C. for an additional 2-½ hours. Chloroacetyl chloride was separated from the mixture by distillation at reduced pressure.

EXAMPLE 2

To 0.5 moles of "100 percent" sulfuric acid, in a 500 ml reaction flask fitted with a stirrer and a reflux condenser, was added a solution of 65.8 grams (0.5 moles) trichloroethylene and 47.2 grams (0.5 mole) chloroacetic acid. The mixture was stirred for 2-½ hours at a temperature in the approximate range of 82°–97° C. Chloroacetyl chloride was separated from the reaction mixture by distillation at reduced pressure.

EXAMPLE 3

The procedure of Example 1 was repeated with the following modification:

To the reaction mixture, at about 100° C., obtained from the reaction of 0.5 moles trichloroethylene and "100 percent" sulfuric acid (0.5 moles) was added, with stirring, in portions, over a 5-minute period, 47.2 grams (0.5 moles) chloroacetic acid and the resultant mixture stirred at approximately 100° C. for an additional hour. Chloroacetyl chloride was separated from the mixture by distillation at reduced temperature.

EXAMPLE 4

The general procedure of Example 2 was repeated using 0.25 moles of "100 percent" sulfuric acid.

EXAMPLE 5

The general procedure of Example 2 was repeated using 0.25 moles (43 grams) p-toluenesulfonic acid in 30 ml n-octane. Reaction temperature was maintained, during the reaction, at approximately 85°–95° C.

EXAMPLE 6

The general procedure of Example 1 was repeated using 55.5 grams (0.5 moles) 1,1-dichloropropene in place of the trichloroethylene to yield propionyl chloride, b.p. 79°–80° C.

EXAMPLE 7

The general procedure of Example 1 was repeated with inversed addition:

To a suitable reaction vessel, fitted with a stirrer and reflux condenser, containing 58.3 gms (0.5 moles) chlorosulfonic acid, at a temperature of approximately 70° C. was added approximately 10 grams chloroacetic acid in one portion. After about 15 minutes, a mixture of 37.2 gms (a total of 0.5 moles) of chloroacetic acid and 65.8 gms (0.5 moles) trichloroethylene was added over a 10 minute period with vigorous stirring. The reaction was stirred at a temperature of 85°–105° C. for an additional 2 hours. Chloroacetyl chloride was separated from the mixture by distillation at reduced pressure.

EXAMPLE 8

To 0.5 moles chlorosulfonic acid, in a suitable vessel equipped with a reflux condenser and stirrer, was added 47.2 grams (0.5 moles) chloroacetic acid in one portion. The mixture was stirred for 1 hour at a temperature in the approximate range of 85° to 105° C. Chloroacetyl chloride was separated from the reaction mixture by distillation at reduced pressure.

EXAMPLE 9

The procedure of Example 8 was repeated with the modification of passing a stream of hydrogen chloride through the reaction medium during both the reaction and distillation steps. A 75 percent yield of chloroacetyl chloride was obtained.

Carboxylic acid chlorides and the chloro derivatives are valuable intermediates in organic processes for the preparation of compounds such as esters and amides. Many of the amides, such as those having an α-chloroacyl moiety, are herbicides.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A process for the preparation and recovery of carboxylic acid chlorides of the formula

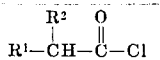

wherein $R^1$ and $R^2$ are each independently selected from the group consisting of hydrogen, halogen and alkyl having a maximum of four carbon atoms which comprises reacting at a temperature between about 75° C and about 125° C, a carboxylic acid of the formula

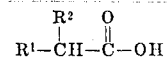

wherein $R^1$ and $R^2$ are as defined above with a chlorosulfonic acid of the formula $R^3SO_2Cl$, wherein $R^3$ is selected from the group consisting of hydroxyl, methyl, ethyl and phenyl, wherein hydrogen chloride is present during both said reacting and recovery steps.

2. A process in accordance with claim 1 in which $R^1$ is alkyl and $R^2$ is hydrogen.

3. A process in accordance with claim 1 in which $R^1$ is hydrogen and $R^2$ is chlorine.

4. A process in accordance with claim 3 in which $R^3$ is hydroxyl.

* * * * *